Figure 9:
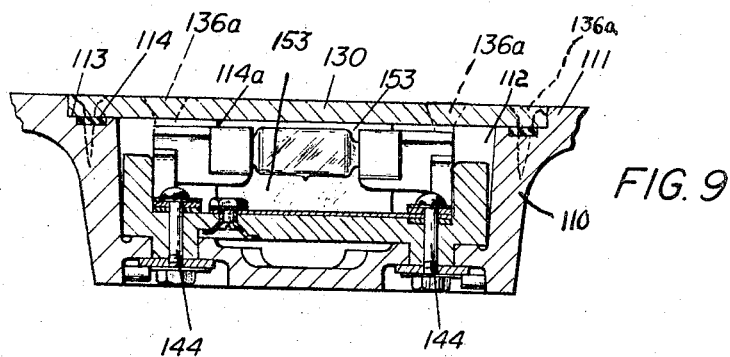

Oct. 24, 1967  J. F. ANGIER  3,349,233
INSET PAVING LIGHT
Filed Jan. 31, 1966  3 Sheets-Sheet 1
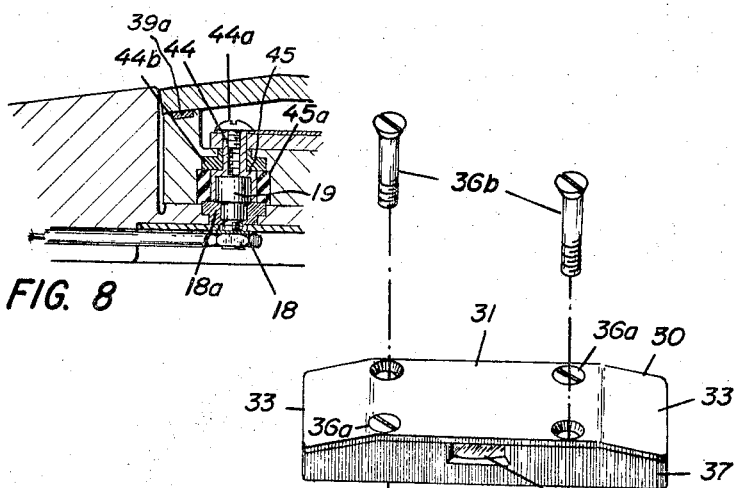
FIG. 8
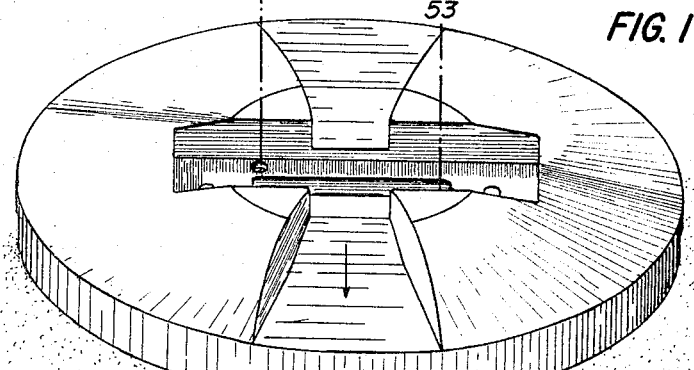
FIG. 1
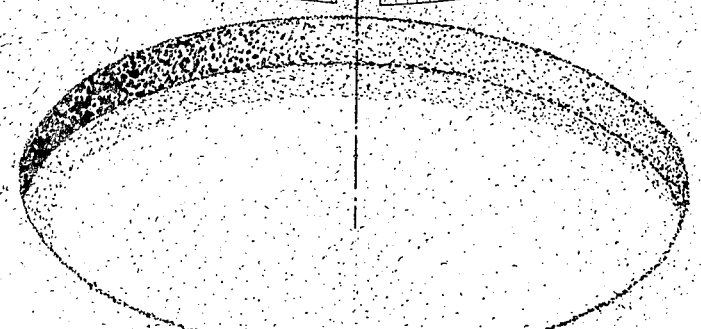
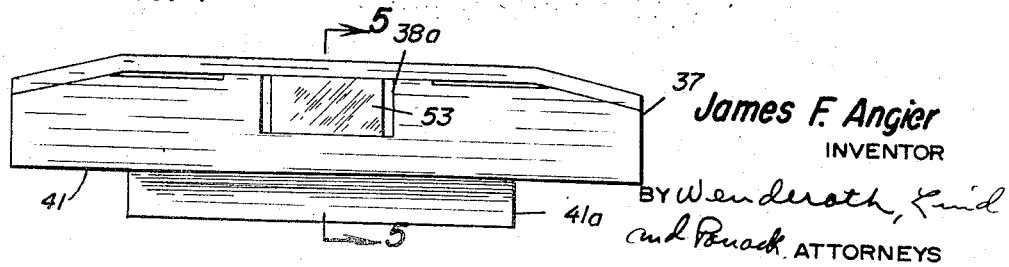
FIG. 4
James F. Angier
INVENTOR
BY Wenderoth, Lind
and Ponack, ATTORNEYS Oct. 24, 1967  J. F. ANGIER  3,349,233
INSET PAVING LIGHT
Filed Jan. 31, 1966  3 Sheets-Sheet 2
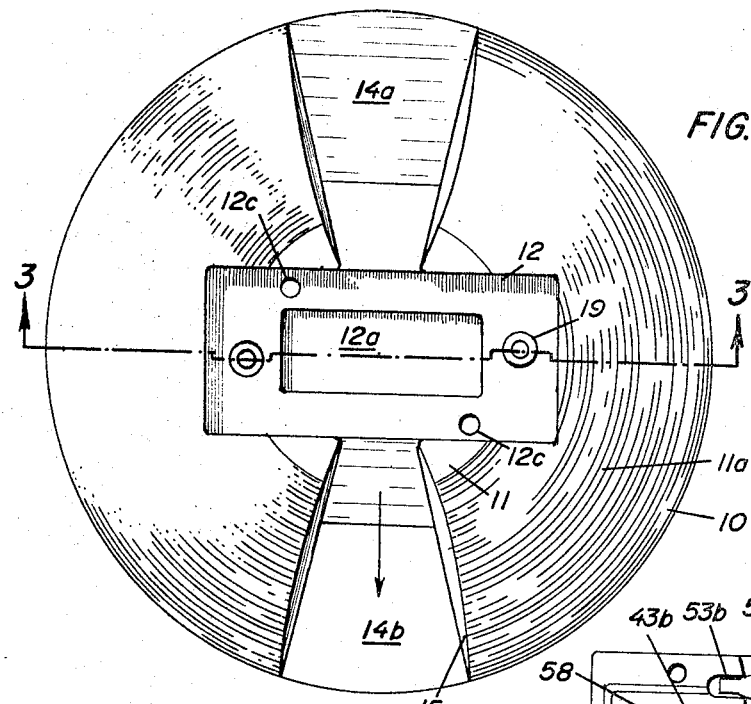
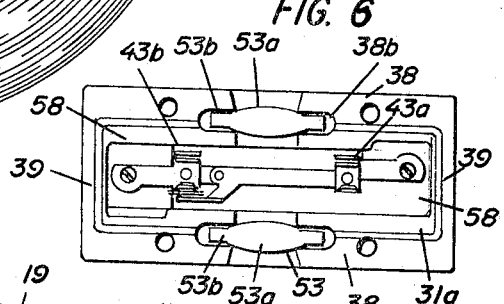
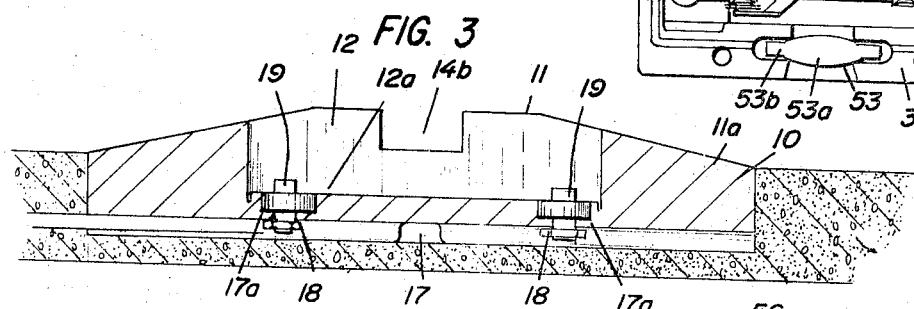
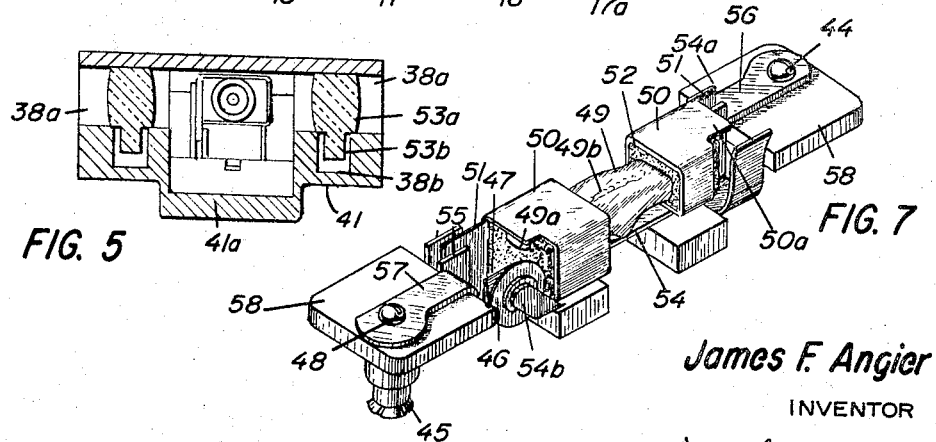
James F. Angier
INVENTOR
BY Wenderoth, Lind
and Ponack, ATTORNEYS Oct. 24, 1967      J. F. ANGIER      3,349,233
INSET PAVING LIGHT Filed Jan. 31, 1966      3 Sheets-Sheet 3

INVENTOR.
James F. Angier
BY *Wenderoth, Lind & Ponack*
ATTORNEYS

United States Patent Office 3,349,233
Patented Oct. 24, 1967

3,349,233
INSET PAVING LIGHT
James F. Angier, deceased, late of Takoma Park, Md., by John L. Cope, administrator, Takoma Park, Md., assignor to Structural Electric Products Corporation, Windsor Locks, Conn., a corporation of Delaware
Filed Jan. 31, 1966, Ser. No. 539,235
21 Claims. (Cl. 240—1.2)

This application is a continuation-in-part of application Ser. No. 271,099, filed Apr. 8, 1963, and application Ser. No. 397,946 filed Sept. 21, 1964, both abandoned.

The present invention relates to a pancake type light which can be set into the surface of a runway, taxiway, or other similar vehicle bearing paved surface easily and quickly.

In Patent No. 3,015,717, dated Jan. 2, 1962, issued to James F. Angier there is disclosed a pancake type light for mounting in a recess in a paved surface. This light has found much success in use on airport runways as a centerline light or boundary marker light, it being very easy to bore shallow holes in new or already existing runways to install these lights and make a sawcut trench along the runway parallel to the holes for the lights for the wiring. These lights consists generally of a base which has a very slightly domed top portion so as to give it a low profile, and a recess is provided in this base opening out of the top. A slot extends from said recess in a direction perpendicular thereto to the peripheral edge of the base. When a unidirectional light is desired, only one slot is provided, and when a bidirectional light is desired, two oppositely extending slots are provided. Over the recess is a cover from which is suspended a lamp and means to detachably connect the lamp ot electrical terminals in the recess. The cover is held in place by a screw at each end thereof, and to remove and replace the lamp, it is only necessary to remove the screws and remove the cover, and then replace the entire cover and lamp unit. This can be done quickly and easily even in inclement weather and between landings and takeoffs on an aircraft runway.

In this light, however, the recess is open to the air through the slots, and the lamp is positioned in this open recess. During the installation and use of these lights in snowy climates, problems of maintenance have arisen which has made it desirable to enclose the lamp so that it is not exposed to the elements.

It is therefore an object of the present invention to provide a pancake type paving light which has a very low profile and in which the lamp is completely enclosed and sealed in the base of the lamp or in an enclosure which fits into the base of the lamp.

It is a further object of the present invention to provide a pancake type runway light in which the lamp is easily replaceable in the covered recess in the base of the lamp or in the separate cover and enclosure assembly. It is a still further object of the present invention to provide a pancake type runway light in which lenses are provided in either in the base of the lamp or in the separate enclosure for the lamp to emit light at a low angle from the light, and in which the lamp can be easily inserted into the base or the enclosure in only one position with respect to the base or the enclosure and lens or lenses, which position it is located with respect to the lens or lenses at the proper longitudinal and vertical position to produce the desired azimuth and elevation of the light beams.

Other and further objects of the present invention will become apparent from the following specification and claims, in which:

FIG. 1 is an exploded view of the inset paving light according to the present invention;

FIG. 2 is a top plan view of the base for the inset paving light of FIG. 1;
FIG. 3 is a sectional view taken on line 3—3 of FIG. 2;
FIG. 4 is a side elevation view, on an enlarged scale, of the cover and box portion of the inset paving light of FIG. 1;
FIG. 5 is a sectional view taken on line 5—5 of FIG. 4;
FIG. 6 is a top plan view of the box portion of FIG. 4 with the cover removed;
FIG. 7 is a perspective view, on an enlarged scale, of the lamp and lamp mounting assembly;
FIG. 8 is a fragmentary sectional view of the box portion in position in the base with the contact means engaged;
FIG. 9 is a sectional view of an inset paving light according to the invention in which the separate enclosure has been omitted; and
FIGS. 10–16 are perspective views of elongated lamps having various forms of contact members on the ends thereof.

As seen in the figures, the light according to the invention comprises a base 10, here shown as generally cylindrical in shape and having a central flat top surface 11 and a slightly tapered conical surface 11a sloping upwardly from the peripheral edge of the base to the peripheral edge of the flat top surface. Opening out of the base 10 through the top surface 11 and part of the conical surface 11a thereof is a recess 12, shown in the present embodiment as an elongated recess which is substantially rectangular in shape. In the bottom of the recess 12 is a depression, which in the embodiment shown has a rectangular longitudinal shape 12a extending parallel to the length of the recess 12 for less than the full length of recess 12. Between the ends of the rectangular longitudinal portion 12a of the depression and the ends of the recess 12 on the bottom of recess 12 are two male electrical contacts 19 adapted to cooperate with female contacts, to be described hereinafter. Also provided in the bottom of the recess 12 adjacent the diagonally opposite corners of the depression 12a are threaded holes 12c. The side walls and end walls of the recess are substantially perpendicular. The base 10 of the illustrated embodiment also has a first slot 14a therein extending perpendicularly from one side of the recess 12 to the peripheral edge of the base, and has a second slot 14b extending from the opposite side of the recess 12 and perpendicular thereto to the peripheral edge of the base. The bottoms of both slots 14a and 14b slope downwardly from the edge of the base to the recess 12. Each slot has side walls 15 which diverge outwardly from the recess 12 to the edge of the base and which are canted at an angle to the vertical which increases continuously toward the peripheral edge of the base.

The base 10 is shown as having no holes therethrough for fastening means such as bolts or screws, but these can be provided if desired. When such holes are omitted, the base is secured to the pavement by a suitable adhesive.

Grooves 17 are provided in the bottom of the base 10 for running wires for the electric power. Extending upwardly into the base from one of the grooves 17 are bores 17a in which are secured the male contacts 19. Securing means 18 in the form of a nut threaded onto the lower end of contact 19 holds the contact in an insulating bushing 18a in bore 17a. Power leads 20 are electrically connected with the contacts 19 and extend from the securing means 18 along the groove 17.

A light cover 30 is provided which has a substantially rectangular top portion 31 which fits over the elongated recess 12. The light cover 30 of the present embodiment has angled ends 33 thereon which are angled downwardly at an angle parallel to the surface 11a. Fastening means in the form of screws 36a and 36b are provided which in the embodiment shown extend through the rectangular portion 31 and are fastened in a manner to be described hereinafter.

Suspended from light cover 30 is a sealed box, generally indicated at 37, which has a shape complementary to the shaped recess 12. In the embodiment illustrated, box 37 has two vertical side walls 38 and end walls 39 substantially perpendicular to cover 30. The side and end walls of the box 37 are integral with or sealed to each other at the corners of the box. The cover 30 is secured over the box by two screws 36a at diagonally opposite corners of the top portion 31, which screws extend into side walls 38 of the box. A gasket 39a extends in a groove along the tops of walls 38 and 39, and is compressed by the cover 30 to seal the box. The enclosure is completed by a bottom 41 which is integral with or sealed to the walls. On the outside of the bottom 41 is a projection 41a which is complementary in shape to the depression 12a in the bottom of the recess 12. This projection engages in the depression and centers the box properly in the recess and provides additional support against lateral movement of the box in the recess. Screws 36b extend through both the cover 30 and the box 37 and engage in holes 12c in the bottom of recess 12 to hold the box against vertical movement in the recess 12.

Each side wall 38 also has an aperture 38a therein aligned with the ends of the slots 14a and 14b. Lenses 53 are hermetically sealed in the aperture. The lenses each have a central body portion 53a and flanges 53b therearound. The flanges fit into recesses 38b around the apertures 38a to hold the lenses in place. They may be sealed in place by a sealing material, such as a rubber gasket or an epoxy resin compound, in the recesses 38b.

Mounted within the box 37 are two electrical contact means which in the embodiment illustrated are two spring jaws 43a and 43b, such as are used in knife switches. The spring jaws are on opposite ends of the space lying between the lenses 53, and are both positioned adjacent the same side of the box 37. One jaw, the jaw 43a, is connected by screw 44a to a first hollow terminal 44 which extends through the bottom 41 of the box 37 at one end thereof and has a female electric contact 45 at the end thereof at the outside of the box which cooperates with one of the male contacts 19 in the bottom of recess 12. As seen best in FIG. 8, the terminal 44 is mounted in an insulating sleeve 44b in the bottom of the box and the female contact 45 is surrounded by a rubber sealing sleeve 45a which projects slightly below the bottom of the box and in the uncompressed condition has a slightly smaller diameter than the diameter of the hole in the box in which it is positioned. The one jaw 43a is also electrically connected with the other jaw 43b through a film disc cutout 46 held in a further jaw 47. In the embodiment shown, the electrical connection is a heavy bus bar 54 which has one end 54a bent up to form one side of the one jaw 43a, and has the other end 54b bent up to form one side of the further jaw 47 holding the film disc cutout 46. The other side of the further jaw 47 in electrically connected to the other jaw 43b. In the embodiment shown, the other side of the jaw 47 and one side of the said other jaw 43b are the uprights on a U-shaped member 55. The U-shaped member 55 is electrically connected to a second terminal 48 which extends through the bottom of the box 30 at the other end thereof in the same manner as terminal 44 and has a female electric contact 45 at the end thereof outside of the box which cooperates with other male contact 19 in the bottom of the recess 12.

In the embodiment illustrated, the electrical connections from the jaws 43a and 43b to the terminals 44 and 48 are bus bars 56 and 57, and the bus bars 54, 56, and 57 and the jaws 43a, 43b, and 47 are all mounted on insulating blocks 58 in the interior of the box 37.

An elongated lamp 49 is provided which has a lamp end holding member 50 at each end thereof, the lamp end holding member having an electrical contact means thereon which cooperates with the electrical contact means mounted within the box 37. In the present embodiment, the lamp end holding members 50 are each in the form of a substantially closed loop of sheet metal and having a blade 51 projecting from the loop in a direction parallel to and away from the lamp. The shapes of the lamp end holding members 50 are different in that the member on one end has the blade 51 on one side of the center line of the lamp 49 and the member on the other end has the blade 51 on the same side of the center line. In the embodiment shown, the blades lie in a vertical plane when the lamp is in the position of normal use and only the bottom edge of the blade is free, there being an extension 50a extending from the member 50 along at least part of the top edge of blade 51. The blades 51 fit into the jaws 43a and 43b, which have a shape complementary to the shape of the blades, to hold the lamp 49 in position between the lenses 53.

Within the loop of sheet metal forming each lamp end holding member 50 is a mass of moldable material 52 which is resistant to heat, such as a ceramic material, in which the end of the glass envelope of the lamp is positioned when the mass of material 52 is soft and which holds the end of the glass envelope fixed relative to the lamp end holding member 50 when the mass of material hardens. The leads 49a from the filament 49b within the glass envelope of the lamp 49 are secured in electrical contact with the members 50, for example by soldering.

The manner of assembling the structure and its operation and use will now be described. It will be understood that when lenses such as the lenses 53 are used to focus a beam of light from the lamp filament 49b in the desired direction along the slots 14a and 14b in the base 10, it is essential that the filament 49b of the lamp 49 be properly positioned within the box 37, both with respect to its end to end orientation as well as its rotational orientation with respect to its axis, that is to say, the top of the light must be up and the bottom down. This is because the lenses have a rather short focal length. Any small displacement of the lamp filament from the proper position within the box 37, which position can be rather precisely fixed by properly placing the lenses in the apetures 38a in the side walls 38 of the box, will cause an undesired displacement of the beam, and as a consequence, the light will not function to direct the beam of light close to the ground. When the light is to be used on a runway, this is particularly bad. In the present state of the art, it is not practical to manufacture the lamps 49 with such precision that all of the filaments 49b are precisely positioned with respect to the glass envelope. Accordingly, if lenses are to be used in the box 37, some way must be provided to precisely locate the filament 49b of the lamp in the proper position despite the fact that the filament itself may not be precisely located with respect to its glass envelope.

The lamp end holding members 50 and the masses of moldable material 52 provide the means for precisely locating the filament 49b of the lamp 49 with respect to the lenses 53. The lenses 53 are mounted in the box 37 so that the optimum position of the filament of the lamp is substantially the same for all boxes. The contact means which are mounted in the boxes are also precisely positioned, so that with the lamp end holding members 50 in the contact means, the lamp filament 49b will be in the vicinity of the optimum position. Then, before the lamps 49 are mounted in the lamp end holding members 50, they are placed in a gauge or jig, and with the masses of moldable material 52 still soft, the ends of the glass envelope are shifted within the masses of moldable material 52 in the lamp end holding members 50 until the filament 49b is in the proper position. Then the masses of moldable material 52 are allowed to harden, after which the lamp 49 and lamp end holding members 50 are ready for insertion into the box 37.

The lamp 49 is mounted in the box 37 by slipping the contact means on the lamp end holding members 50 into the contact means mounted in the box 37. In the present embodiment this is accomplished by inserting the blades 51 between the jaws 43a and 43b. Since the blades 51 both lie on the same side of the center line of the elongated lamp 49 and the jaws 43a and 43b are both adjacent the same side wall 38 of the box, and only the bottom edge of the blades is free, the lamp 49 can only be placed into the box 37 in one position, both as to end for end orientation and as to rotational orientation with respect to the lamp axis, the position in which the bottom edges of the blades 51 are placed into the jaws 43a and 43b first. If the lamp 49 with the lamp end holding members 50 is turned upside down, the extensions 50a will block insertion of the blades into the jaws, while if the lamp is turned end for end, the blades will be on the opposite side of the box 37 from the jaws 43a and 43b. Thus, the lamp 49 can be positioned in only one position, the position in which the filament 49b has been previously determined to be in the optimum position in the box 37 with respect to the lenses 53.

It will therefore be seen that the lamp end holding members 50 must have two characteristics. First, they must be such that the ends of the glass envelope of the lamp 49 can be adjustably positioned in the end holding members and thereafter fixed in the adjusted position, and second, they must be such that the electric contact means thereon will engage with the electric contact means in the box 37 when the lamp is in only one position, both as to its end for end orientation and as to its rotational orientation. The preferred way of providing these characteristics is by the embodiment described and illustrated, in which the moldable ceramic material 52 is provided in the lamp end holding members 50, and in which the cooperating jaws 43a and 43b and blades 51 both lie on the same side of a plane through the center line of the lamp 49 and extending in the direction in which the contact means is oriented, i.e. in the direction of blades 51, and the extension 50a along the top of the blade 51 prevents its insertion into the jaws exception with the free bottom edge down.

Thereafter, when the top has been secured to the box 37, when the box is placed into the recess 12 in the base 10, the electrical contacts 45 will contact the contacts 19 and sleves 45a will be compressed and will form a tight seal against the bushing 18a so as to seal the contact between contacts 45 and 19, as seen in FIG. 8. The current will flow through the terminals 44 and 48 to the jaws 43a and 43b and thence through the lamp filament 49b. Should the filament burn out, the film disc cutout 46 will be burned through, thereby establishing a circuit in parallel with the burned out lamp.

During maintenance, the maintenance worker, seeing a light with a burned out lamp, merely unscrews the two screws 36b which hold the box 37 in the recess 12, and removes the box. After the box has been removed, the maintenance worker replaces it with an identical unit having a good lamp therein, placing the box in the proper position so that the projection on the bottom of the box fits into the depression 12a and the box fits into the recess 12 with the top 30 flush with top of the base. As the box moves down, the contacts 45 are pressed over the contacts 19 and the sleeves 45a seal the contacts. The box is then secured in place with the screws which extend into threaded holes 12c in the bottom of recess 12. With the cover and box in this position, the lamp and other electrical fittings within the box are sealed against the ingress of water, while the contacts 19 and 45 will also be sealed against water, since the sleeve 45a is compressed into the recess in the box as seen in FIG. 8.

The maintenance worker now has a cover with a box thereon which has a burned out lamp in it. This together with the other cover and box units with burned out lamps is taken to the repair shop and the remaining screws 36a are unscrewed and the top removed. The assembly of the burned out lamp 49 and the holders 50 are simply removed from jaws 43a and 43b and replaced with a new pre-focused lamp assembly and a new film disc cutout. The cover 30 is replaced and the box unit is ready for re-use. It will be understood that by providing lenses instead of merely clear transparent closures for the apertures 38a, it is possible to cause the light rays from the lamp to bend as they pass through the apertures and start along the slots 14a and 14b. This makes it possible to space the lamp below the cover 30 sufficient distance so that if the cover flexes at all under a load, it does not touch and damage the lamp. The profile of the light can be made very low and even if the lamp is actually below the level of the runway in which it is placed, by bending the light rays through the lenses, the main light concentration can be made to shine between the horizontal and an angle of 20° above the runway with light of moderate intensity being projected at an angle up to 40°. Thus, the lenses make it possible to mount the lamp so that it is not damaged by the flexure of the cover and so that the profile of the light can be kept low. In order to clean or replace the lenses, the cover 30 is removed from the box and the lenses slipped out of the recesses 38b.

It is of course possible to use clear, uncolored lenses, or colored lenses if colored light is desired. It is also possible to vary other elements without departing from the scope of the invention. For example, the base need not be round, although this is a convenient shape, since it is a simple matter to drill a round hole in an already existing paved surface into which the round base may be placed. One of the slots 14a or 14b could be omitted and a lens placed in only one side of the box, or the slots could be at an angle to each other and the lamp filament longitudinally offset to shine a light beam along them. Further, the recess 12 in the base need not be rectangular, as long as the recess 12 and the box 37 have complementary shapes. However, with the lamp being elongated, and with it being desirable to make the recess as small as possible, the elongated shape of the recess is preferred, and the rectangular shape shown is the easiest and most convenient to make. Likewise, the depression 12a in the bottom of the recess 12 need not be of the exact shape shown, as long as it and the projection on the bottom of the box are complementary in shape. It will also be possible to provide other securing means for the cover and the box, or to provide the screws 36a and 36b in other locations. The contacts 19 and 45 could be reversed, the female contacts 45 being placed on the base and the male contacts 19 being placed on the ends of the terminals 44 and 48. The gasket 39a could be placed in the cover and press on the tops of the side and end walls of the box 37. Insulated wires can be used in place of the bus bars for conducting the current.

Likewise, the means giving the required characteristics to the lamp end holding members 50 and the electric contact means thereon and the electric contact means mounted in the box can be varied from the embodiment disclosed. For example, the jaws 43a and 43b could be placed on the lamp end holding members 50, opening downwardly, while the blades 51 could be positioned on the insulating blocks in the box. As long as both blades were on the same side of the plane through the center line of the lamp 49, and the jaws were properly positioned on the members 50, the required relationships would be maintained, and the lamp could only be placed in the box in one position. It would also be possible to provide curved jaws and rounded contact members on the lamp end holding members 50, with the positional relationships remaining the same. Different sized contact members at opposite ends of the lamp and the box might also be used, with both being on the same side of the plane through the center line of the lamp, the cooperating contact means could be made of different sizes to make sure the proper end of the lamp was at the proper end of the box, and the contact means could be made with a cross-sectional shape such that they would fit into the cooperating contact means when inserted in one direction, but would not fit properly when inserted upside down. Other variations will readily suggest themselves to those skilled in the art from the foregoing explanation of the necessary characteristics.

It will thus be seen that there has been provided a light for installation in paving, which light has a low profile, yet can direct light rays at a very small angle to the paved surface. The low profile keeps the shocks given to wheels rolling over the light to a minimum, and the tapered surface 11a will cause such equipment as snowplow blades to be lifted to run over the light rather than catch on the light and tear it from the runway. Moreover, with the cover in the center of the flat surface 11, it will not be caught by a snowplow blade and torn out of the light. The lamp which provides the source of illumination and the electrical connections are sealed against the elements, yet the lamp by being mounted in a box on an easily removable cover can be changed quickly and easily merely by removing the fastening means extending through the cover and box and lifting the cover and box out of the light and replacing it by a similar cover and box with a good lamp in it. The burned out lamp can be easily and quickly replaced but it can only be positioned in one position in the box, the position which is proper with respect to the lenses, whereupon the box and cover unit is reusable.

The light according to the invention does not have to have a separate sealed box suspended from the light cover. In the embodiment shown in FIG. 9, the sealed box has been omitted, and the lenses instead are mounted right in the base, and the cover is secured directly to the base and a sealing gasket is provided around the periphery of the recess in the base.

As seen in FIG. 9, the light comprises a base 110, again shown as generally cylindrical in shape and having the central flat top portion 111, and otherwise similar in shape to the base 10 of FIGS. 1–8. However, around the top of the recess 112 in the base is a ledge 113 which is recessed below the top portion 111, and in which is positioned a gasket 114. A cover 130, similar in shape to cover 30, is provided which seats on the ledge 113 and seals against the gasket 114. The lenses 153 are sealed in grooves in the base around the openings of the slots 114a and the corresponding slot opposite slot 114a, which is not seen in FIG. 9, and the gasket 114 extends across to tops of the lenses and the cover 130 seals against these portions of the gasket. The recess 112 is thus completely sealed off from the outside of the light when the cover is in position. The cover is held in place by the screws 136a which extend into threaded holes in the base.

Electrical contact means which is substantially the same as electrical contact means within the box 37 in the embodiment of FIGS. 1–8 is mounted within the sealed recess 112 of the base. The terminals 144 extend through the base of the light instead of through the bottom of the box.

This embodiment of the light is intended for use where the climatic conditions are not as severe as the areas where the embodiment of FIGS. 1–8 can be used, and where there is not as much urgency or difficulty in maintenance operations on the lamps at the installed locations thereof. In order to replace a lamp in the light according to this embodiment, the cover must be removed, and the burned out lamp removed and a replacement lamp substituted. It will be seen that this requires the removal of four screws rather than two, and that it may take slightly more time. In addition, the lenses must be cleaned with the light in position in the paved surface rather than removed from the pavement. There are many installations in which such a lamp will be every bit as useful as the more complex, and hence more expensive lamp of FIGS. 1–8, for instance in roadways, parking lots, and the like.

It will be seen that the electrical contact portions 51 on the lamp end mounting members 50 are the same shape, i.e. vertical flat blades which fit between jaws 43a and 43b. In order to insure that the lamp is in proper end for end orientation, it is essential that the blades not fit into the jaws with the ends of the lamp reversed. This is accomplished in the embodiment of FIGS. 1–8 by having the blades 51 both offset from a plane through the centerline of the lamp 49 on the same side of the plane. If the lamp is reversed end for end, the vertical blades 51 will match up with the jaws 43a and 43b, but the body of the lamp will be so far offset from the cavity provided for it that it will not go down into the box. In addition, in order to insure that the lamp is properly oriented with respect to its rotational position about the central longitudinal axis of the lamp, i.e. that is, not upside down, the portions 50a are provided which make the contact portions asymmetrical in a direction parallel to a plane through the centerline of the contact portion and extending in the direction of the blades and which will block insertion of the blades 51 into the jaws with the lamp upside down.

Figure 10:
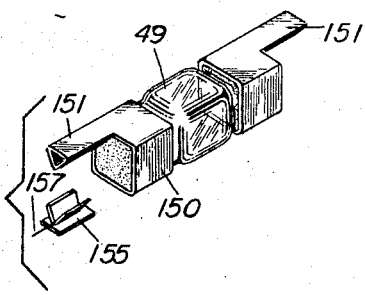

The blade structure shown in FIGS. 1–8 is of course not the only type of contact structure which will accomplish these ends. Generally speaking, any contact member shape which is the same on both ends of the lamp will suffice where the contact members are offset on the same side of the plane through the centerline of the lamp, or one is offset and one is on the centerline. In addition, the shape of these contact members must be directionally oriented in the direction of the plane through the centerline of the contact portion and asymmetrically in a direction parallel to said plane such that only one side, i.e. the bottom side, can be inserted into the contacts. As seen in FIG. 10, a triangular cross-section contact member 151 can be used on the lamp end mounting member 150 with the pointed edge of the contact member down, and a complementary shaped receiving contact member 155 is provided which also has a triangular cross-section with the wide edge opening upwardly. It will be seen that both contact members 151 are on the same side of a plane through centerline CL. A conductor 157 extends to one of the contacts in the box.

Figure 11:
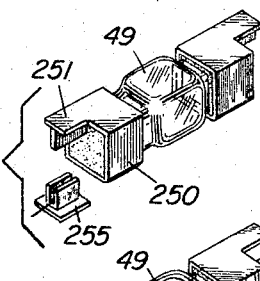

Another shape which can be used is that which has a T-shaped cross-section, such as shown at 251 in FIG. 11. In this instance, the vertical blade portion of the contact member is offset from a plane through the centerline of the lamp, and fits between the vertical jaw portions 255, which are also offset from a plane through the centerline of the lamp. The cross portion of the T-shaped contact member prevents the lamp from being inserted into the jaws 255 in the upside down position.

Figure 12:
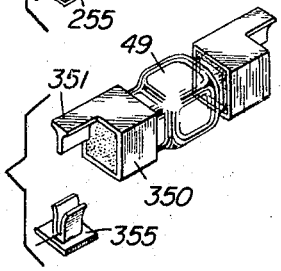

A still further shape which can be used is shown in FIG. 12. The cross-sectional shape of this contact member 351 will be described as asymmetrical hyperbolic, i.e., the opposed surfaces curve inwardly toward each other and then outwardly again, but the distance between the top ends of the curves is greater than between the bottom ends. As with the embodiments of FIGS. 10 and 11, the contact members 351 are both on the same side of a plane through the centerline and because they are wider at the top than at the bottom, will not easily slip into the complementary shaped contact members 355 when the limp is upside down.

Figure 13:
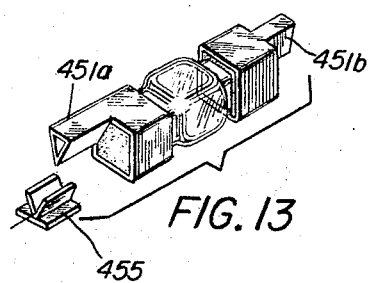

As can be seen from the description of the embodiments of FIGS. 10–12, the contact members can have the same cross-sectional shape as long as they are offset on the same side of a plane through the centerline of the lamp. From this it can be seen that any asymmetrical positioning of identically shaped contact members with respect to a plane through the centerline of the lamp will prevent insertion of the lamp in an incorrect end for end position. For example, instead of positioning them both on the same side of a plane through the centerline, they can be positioned one offset from the plane and the other on the centerline, as shown in FIG. 13. In this figure, the triangular cross-sectional shape contact member 451a on the one end of the lamp is positioned on the centerline of the lamp, while the contact member 451b at the other end is offset from a plane through the centerline. It will be understood that the receiving contact members 455 must be similarly located.

Figure 14:
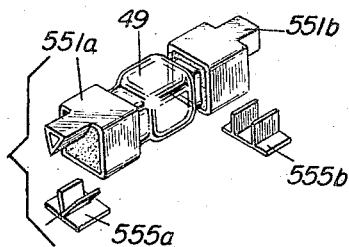

It is also possible to insure the proper location of the lamp 49 in the light according to the invention by making the contact members on opposite ends of the lamp different shapes. As seen in FIG. 14, the contact member 551a on one end of the lamp has a triangular cross-section, being mounted on the lamp end mounting member 550 and fitting into the receiving contact member 555a, which has a complementary shape. The contact member 551b at the other end of the lamp has a rectangular cross-section, the term "rectangular" including "square." The receiving contact member 555b has a shape for receiving the rectangular contact member 551b. At least one of the contact members on the lamp must have a shape which will substantially prevent its insertion into either of the receiving contact members with the lamp in the upside down position. In this embodiment, the triangular contact member 551a is such that it cannot fit into either of the receiving contacts 555a or 555b when the lamp is in the upside down position. In this embodiment, the contact members are on the centerline of the lamp, but it is not essential that this be the case in this type of embodiment.

Figure 15:
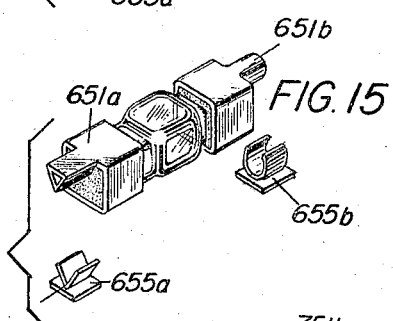
Figure 16:
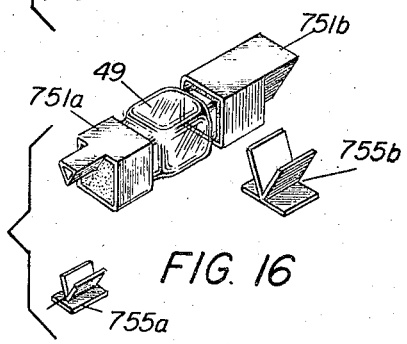

Other shapes for the contact members are also possible. As seen in FIG. 15, the contact member 651a on one end of the lamp is triangular in cross-section, while the contact member 651b on the other end of the lamp is circular in cross-section.

It is also possible to use contact members which are the same shape but which are of different sizes. In the embodiment shown in FIG. 16, both the contact members 751a and 751b are triangular in cross-section, but contact member 751a is smaller than contact member 751b, and in the same manner the receiving contact members 755a and 755b are small and large respectively in order to accommodate the proper contact member on the lamp. The triangular shape insures that the lamp will not be inserted into the receiving contacts upside down.

Thus, in all embodiments it is necessary that at least one of the contact members on the lamp be asymmetrical in a direction parallel to a plane through the central longitudinal axis of the contact and directionally oriented in the direction of the plane and preferably with the widest portion of the contact member at the top of the lamp in order to insure that the lamp is not inserted into the receiving contacts upside down, while when the contacts on the opposite ends of the lamp are the same shape and size, they must be asymmetrically located with respect to a plane through the longitudinal axis of the lamp. Otherwise, they can merely be different shapes or the same shape and different sizes.

It is thought that the invention and its advantages will be understood from the foregoing description and its apparent that various changes may be made in the form, construction and arrangement of the parts without departing from the spirit and scope of the invention or sacrificing its material advantages, the form hereinbefore described and illustrated in the drawings being merely a preferred embodiment thereof.

What is claimed is:

1. A light, particularly for installation in a surface over which wheeled vehicles run, comprising a base having a recess therein opening out of the top of the base, said base having a slot therein extending from said recess substantially perpendicularly thereof at least in one direction from said recess to the peripheral edge of said base, at least one bore extending into the bottom of the base and opening into said recess therein, a first contact means mounted in said bore adjacent said recess, a cover over said recess, means detachably securing said cover to said base, a transparent lens covering the end of said slot at said recess, an elongated lamp within said recess, receiving electric contact members mounted in said recess and electrically connected to the contact means, and means removably mounting said elongated lamp within said recess with the filament thereof at the optimum position with respect to said lens, said mounting means comprising lamp end mounting members in which the ends of the lamp are held, said lamp end mounting members having contact portions thereon, the contact portion on at least one lamp end mounting member having a shape which is asymmetrical in a direction parallel to the direction of a longitudinal plane through the longitudinal central axis of the contact portion, the contact portion on the end member on one end of the lamp having a shape which is complementary to the receiving electric contact member for said one end member and being engageable with said electric contact member when the lamp is in only one rotational position relative to its axis, and the contact portion on the end mounting member on the other end of the lamp having a shape complementary to the receiving electric contact for said other end member and being engageable with said electric contact member only when the lamp is in said one rotational position, and when said contact portions have the same size and shape, said contact portions being asymmetrically positioned relative to a plane through the centerline of said lamp and parallel to said first material plane whereby the lamp can be positioned in the recess in only one position both with respect to its end for end orientation and its rotational position about its axis and the filament in the lamp is at the optimum position with respect to the lens.

2. A light as claimed in claim 1 in which the contact portions are the same shape and different sizes.

3. A light as claimed in claim 1 in which the contact portions are different shapes.

4. A light as claimed in claim 1 in which the contact portions are the same shape and size and both lie on the same side of the plane through the centerline of the lamp.

5. A light as claimed in claim 1 in which the contact portions are the same shape and size and one lies on the centerline of the lamp and the other is offset from the plane through centerline of the lamp.

6. A light as claimed in claim 1 further comprising a box positioned within said recess and removably secured to the under side of said cover, said box having an opening in the side thereof in which said lens is sealed, and said box having further contact means extending through tht bottom thereof engaging said contact means in said recess, said receiving electric contact means being mounted within said box and electrically connected to said further contact means, and said lamp and lamp mounting means being within said box.

7. A light, particularly for installation in a surface over which wheeled vehicles run, comprising a base having a recess therein opening out of the top of the base, said base having a slot therein extending from said recess substantially perpendicularly thereof at least in one direction from said recess to the peripheral edge of said base, at least one bore extending into the bottom of the base and opening into said recess therein, a first contact means mounted in said bore adjacent said recess, a cover over said recess, means detachably securing said cover to said base, a transparent lens covering the end of said slot at said recess, an elongated lamp within said recess, receiving electric contact members mounted in said recess and electrically connected to the contact means, and means removably mounting said elongated lamp within said recess with the filament thereof at the optimum position with respect to said lens, said mounting means comprising lamp end mounting members in which the ends of the lamp are held, said lamp end mounting members having contact portions thereon, the contact portion on at least one lamp end mounting member having a vertical blade portion and a transverse blade portion extending laterally therefrom, the receiving electric contact member at the end of the lamp having said vertical blade portion thereon having jaw members for receiving said vertical blade portion with said lamp in only one position, and the contact portion on the end mounting member on the other end of the lamp having a shape complementary at least in part to the receiving electric contact for said other end member and being engageable with said electric contact member only when the lamp is in said one rotational position, and when said contact portions have the same size and shape, said contact portions being asymmetrically positioned relative to a plane through the centerline of the lamp and parallel to said vertical blade portions, whereby the lamp can be positioned in the recess in only one position both with respect to its end for end orientation and its rotational position about its axis and the filament in the lamp is at the optimum position with respect to the lens.

8. A light as claimed in claim 7 in which said contact portions have the same cross-sectional shape and size and lie on the same side of the plane through the centerline of said lamp.

9. A light as claimed in claim 7 in which said contact portions each have a vertical blade portion and a transverse blade portion, the vertical blade portion of one contact portion lying on the centerline of said lamp and the vertical blade portion of the other contact portion being offset from the plane through the centerline of said lamp.

10. A light as claimed in claim 7 in which said contact portions each have a vertical blade portion and a transverse blade portion, the vertical blade portions being offset asymmetrically relative to the plane through said centerline of said lamp.

11. A replacement unit for a runway light, particularly for installation in a surface over which wheeled vehicles run and having a base with a recess therein and a slot extending from the recess substantially perpendicular to the recess in at least one direction from the recess and having contact means in said recess, said replacement unit comprising a cover adapted to cover the recess in the base, means adapted to detachably secure the cover to said base, a box secured in watertight engagement to the bottom of the cover and adapted to fit into the recess, a contact means on the outside of said box adapted to engage the contact means in the recess, said box having at least one transparent lens therein adapted to be positioned opposite the end of the slot when the box is in the recess, an elongated lamp within said box receiving electric contact members mounted in said box and electrically connected to the contact means on the outside of the box, and means removably mounting said elongated lamp within said box with the filament thereof at the optimum position with respect to said lens, said mounting means comprising lamp end mounting members in which the ends of the lamp are held and which end mounting members removably engage said receiving electric contact members, said end mounting members having contact portions which are differently shaped from each other and the contact portion of the end member on one end of the lamp having a shape complementary to the receiving electric contact member for said one end member and being engageable with said electric contact member when the lamp is in only one rotational positions relative to its axis, and the contact portion of the end member on the other end of the lamp having a shape complementary to the receiving electric contact member for said other end member and being engageable with said electric contact member only when the lamp is in said one rotational position, whereby the lamp can be positioned in the box in only one position both with respect to its end-for-end orientation and its rotational position about its axis and the filament in the lamp is at the optimum position with respect to the lens.

12. A replacement unit for a runway light, particularly for installation in a surface over which wheeled vehicles run and having a base with a recess therein and a slot extending from the recess substantially perpendicular to the recess in at least one direction from the recess and having contact means in said recess, said replacement unit comprising a cover adapted to cover the recess in the base, said cover being adapted to be detachably secured to said base, a box secured in watertight engagement to the bottom of the cover and adapted to fit in the recess, a contact means on the outside of said box adapted to engage the contact means in the recess, said box having at least one transparent lens therein adapted to be positioned opposite the end of the slot when the box is in the recess, two spaced receiving electric contact members mounted in said box for removably engaging lamp end mounting members on an elongated lamp and positioning the lamp within the box with the filament thereof at the optimum position with respect to the lens, one of said receiving electric contact members having a shape complementary to the shape of the lamp end mounting member on only one end of the elongated lamp and being engageable with said lamp end mounting member when the lamp is in only one rotational position relative to its axis, and the other of said receiving electric contact members having a shape complementary to the shape of the lamp end mounting member on the other end of the elongated lamp and being engageable with said other lamp end mounting member only when the lamp is in said one rotational position, whereby the lamp can be positioned in the box in only one position both with respect to its end-for-end orientation and its rotational position about its axis and the filament in the lamp is at the optimum position with respect to the lens.

13. A replacement unit for a runway light, particularly for installation in a surface over which wheeled vehicles run and having a base with a recess therein and a slot extending from said recess substantially perpendicular to said recess in at least one direction from the recess and having contact means in said recess, and said light further having a cover for covering said recess and means adapted to secure said cover to said base, said replacement unit comprising a box adapted to be removed secured in watertight engagement to the bottom of said cover and adapted to fit in said recess, a contact means on the outside of said box adapted to engage the contact means in said recess, said box having at least one transparent lens therein adapted to be positioned opposite the end of the slot when the box is in the recess, two spaced receiving electric contact members mounted in said box for removably engaging lamp end mounting members on an elongated lamp and positioning the lamp within the box with the filament thereof at the optimum position with respect to the lens, one of said receiving electric contact members having a shape complementary to the shape of the lamp end mounting member on only one end of the elongated lamp and being engageable with said lamp end mounting member when the lamp is in only one rotational position relative to its axis, and the other of said receiving electric contact members having a shape complementary to the shape of the lamp end mounting member on the other end of the elongated lamp and being engageable with said other lamp end mounting member only when the lamp is in said one rotational position, whereby the lamp can be positioned in the box in only one position with respect to its end-for-end orientation and its rotational position about its axis and the filament in the lamp is at the optimum position with respect to the lens.

14. A lamp replacement unit comprising an elongated lamp, a lamp end mounting member at each end of said lamp and holding the ends of said lamp, and an electric contact portion on each lamp end mounting member and extending away from the ends of the lamp, the contact portion on each lamp end mounting member having a shape which is asymmetrical in a direction parallel to the direction of a longitudinal plane through the longitudinal central axis of said contact portion, the contact portions being adapted to be inserted into receiving electric contact members in a base of a lamp which base has at least one lens in the side thereof and which contact members have shapes complementary to the shapes of the contact portions at the respective ends of the lamp and said contact portion on said one lamp end mounting member being directionally oriented in the direction of said plane for easy insertion into the receiving electric contact member therefor so that the contact portions are engageable in said contact members when the lamp is in only one rotational position relative to the axis of the lamp, and when said contact portions have the same size, said contact portions being asymmetrically positioned relative to a longitudinal plane through the longitudinal axis of said lamp, and parallel to said first mentioned plane, whereby the lamp can be positioned in the receiving electric contact members in only one position both with respect to its end for end orientation and its rotational position about its axis and the filament in the lamp is at the optimum position with respect to the lens.

15. A light as claimed in claim 14 in which the contact portions are the same shape and different sizes.

16. A light as claimed in claim 14 in which the contact portions are the same shape and size and both lie on the same side of the said longitudinal plane through the lamp.

17. A light as claimed in claim 14 in which the contact portions are the same shape and size and one lies on the longitudinal centerline of the lamp and the other is offset from the longitudinal vertical plane through the lamp.

18. A lamp replacement unit comprising an elongated lamp, a lamp end mounting member at each end of said lamp and holding the ends of said lamp, and an electric contact portion on each lamp end mounting member, said electric contact portion having a vertical blade portion extending away from the ends of the lamp, and having a transverse blade portion extending laterally therefrom along at least part of the top edges of said vertical blade portion, said blades being asymmetrically positioned with respect to the longitudinal axis of said lamp and being adapted to be inserted into electric contact members in the form of jaws in a recess in a light base with at least one lens in the side thereof such that only the bottom edges of the blades can move into the jaws first, whereby the lamp can be positioned in the light base in only one position both with respect to its end-for-end orientation and its rotational position about its axis and the filament in the lamp is at the optimum position with respect to the lens.

19. A lamp replacement unit as claimed in claim 18 in which said contact portions each have a vertical blade portion and a transverse blade portion, the vertical blade portion of one contact portion lying on the longitudinal centerline of said lamp and the vertical blade portion of the other contact portion being offset from the longitudinal centerline of said lamp.

20. A light as claimed in claim 18 in which said contact portions each have a vertical blade portion and a transverse blade portion, the vertical blade portions being offset asymmetrically relative to said longitudinal centerline of said lamp.

21. A lamp replacement unit comprising an elongated lamp, a lamp end mounting member at each end of said lamp and holding the ends of said lamp, and an electric contact portion on each lamp end mounting member and extending away from the ends of the lamp, said contact portions having different shapes, the contact portion on one lamp end mounting member having a shape which is asymmetrical in a direction parallel to the direction of a longitudinal plane through the longitudinal central axis of said contact portion, the contact portions being adapted to be inserted into receiving electric contact members in a base of a lamp which base has at least one lens in the side thereof and which contact members have shapes complementary to the shapes of the contact portions at the respective ends of the lamp and said contact portion on said one lamp end mounting member being directionally oriented in the direction of said plane for easy insertion into the receiving electric contact member therefor so that the contact portions are engageable in said contact members when the lamp is in only one rotational position relative to the axis of the lamp, whereby the lamp can be positioned in the receiving electric contact members in only one position both with respect to its end for end orientation and its rotational position about its axis and the filament in the lamp is at the optimum position with respect to the lens.

References Cited

UNITED STATES PATENTS

| | | | |
|---|---|---|---|
| 1,104,961 | 7/1914 | Chapman et al. | 313—51 |
| 1,779,502 | 10/1930 | Steinmayer. | |
| 1,995,148 | 3/1935 | Illingworth. | |
| 2,160,786 | 5/1939 | Peterson | 339—50 X |
| 2,942,228 | 6/1960 | Swick | 339—184 X |
| 3,113,726 | 12/1963 | Pennow et al. | 240—1.2 |
| 3,114,506 | 12/1963 | Finch | 240—1.2 |
| 3,250,906 | 5/1966 | Loch | 240—1.2 |

FOREIGN PATENTS 188,823    11/1922    Great Britain.

NORTON ANSHER, *Primary Examiner.*

J. F. PETERS, *Assistant Examiner.*